March 12, 1963 W. L. JONES 3,080,745

COMPENSATED BRIDGE CIRCUIT

Filed April 25, 1960

INVENTOR
WALTER L. JONES

BY Harry J. McCauley

ATTORNEY

United States Patent Office 3,080,745
Patented Mar. 12, 1963

3,080,745
COMPENSATED BRIDGE CIRCUIT

Walter L. Jones, Wilmington, Del., assignor to E. I. du Pont de Nemours and Company, Wilmington, Del., a corporation of Delaware Filed Apr. 25, 1960, Ser. No. 24,522
4 Claims. (Cl. 73—27)

This invention relates to a compensated electrical bridge circuit in which thermally sensitive resistors are included in similar arms, and particularly to an electrical bridge circuit wherein substantially complete compensation for fluctuations of both supply voltage and ambient temperature is concurrently effected.

It has long been recognized that certain instabilities are inherent in the operation of electrical resistance bridges for gas analysis purposes, and certain measures have evolved for achieving compensation, one being that taught in U.S. Patent 2,734,376 specifically for background gas composition existing during thermal gas analysis. However, very serious instability still exists as regards fluctuations of supply voltage, ambient temperature and rate of heat loss from the sensing arms especially, and it is the principal object of this invention to provide a compensated electrical bridge adapted to safeguard operation from interference due to these causes and, moreover, to effect the compensation concurrently and with relatively inexpensive and reliable means.

While this invention is broadly applicable to electrical resistance bridges having powered thermally sensitive arms in pairs, it is particularly intended for use in conjunction with thermistor bridges employed as the measuring agency in chromatographic gas analysis, such as described in detail in copending application S.N. 24,501, which teaches a shielded resistor construction effective independently in avoidance of yet other causes of error in such analyses, namely, those occasioned by gas velocity fluctuations and mechanical vibrations on the sensing thermistor elements.

Figure 1:
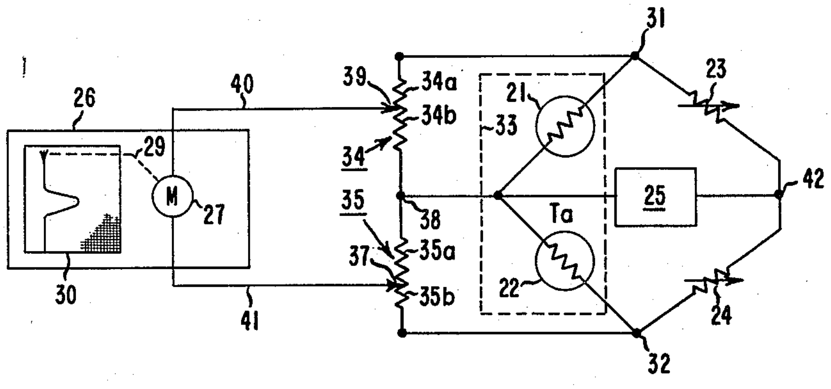
Figure 2:
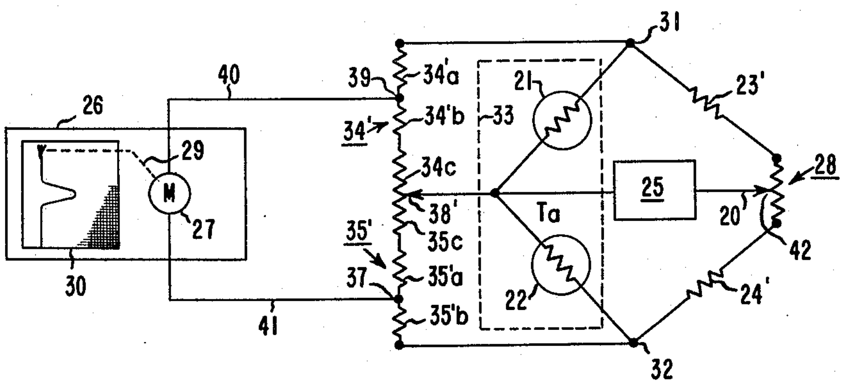

The manner in which the objects of this invention are achieved will become apparent from the following detailed description and the drawings, in which:

FIG. 1 is a circuit diagram of one embodiment of bridge according to this invention typifying the basic circuit configuration, and FIG. 2 is a circuit diagram of a preferred species of the apparatus shown in FIG. 1.

Generally, the compensated electrical bridge circuit according to this invention comprises, in combination, a D.-C. power source, first and second temperature-sensitive resistors, preferably thermistors, each connected at one end to a common terminal of the power source, first and second load resistors each connected at one end to the other terminal of the power source and at the other ends singly to the respective ends of the first and second temperature-sensitive resistors remote from the power source, thereby forming a pair of opposite junctions for the bridge, a first voltage divider connected in shunt relationship with respect to the first temperature-sensitive resistor between the junction of the pair adjacent to the first temperature-sensitive resistor and the common terminal of the power source, a second voltage divider connected in shunt relationship with respect to the second temperature-sensitive resistor between the junction of the pair adjacent to the second temperature-sensitive resistor and the common terminal of the power source, and voltage indicating means connected across the taps of the voltage dividers, the resistance values of the load resistors being preselected so as to effect a concurrent compensation for power supply voltage and ambient temperature fluctuations encountered during the chromatographic analysis, and the taps of the voltage dividers being positioned prior to commencement of analysis with respect to the associated divider resistors so as to effect a nulling of the net voltage output of the bridge when the first and second temperature-sensitive resistors are exposed to the same environment and ambient temperature.

Referring to FIG. 1, a resistance bridge adapted to chromatographic gas analysis comprises essentially the two thermally sensitive measuring resistors, for example, thermistors, 21 and 22, which are connected in the bridge circuit at a pair of opposite junctions 31 and 32 with variable load resistors 23 and 24 of low temperature coefficient and similar characteristics, which may each typically have a resistance value of 10,000 ohms. As is conventional practice in the art, load resistors 23 and 24 are chosen so as to match electrically at the service temperatures involved (usually 20–30° C. for these resistors), because of the relatively limited temperature ranges throughout which most resistor materials display their best temperature insensitivities. Thermistors 21 and 22 are typically of a type displaying resistances of about 8000 ohms when cold, ranging down to as low as 100 ohms under operating conditions where the thermistor temperature may reach about 200° C. In chromatographic gas analysis the thermistors are matched one with another to obtain as nearly equal responses to given changes in the gas concentrations to be measured as practicable. They are then mounted in the thermally insulated, heated, thermostatically controlled analytical cell, indicated generally at 33, within which one thermistor is exposed to a flow of carrier gas solely, whereas the other is exposed to the effluent gas from the chromatographic column, which consists of carrier gas plus the several chromatographically separated sample gas components passed through in time sequence.

Operating current is supplied to the bridge from the power source indicated generally at 25, which is typically a 90–100 volt commercially available electronic D.-C. power supply operating from the mains and provided with good voltage regulation adapted to maintain the output constant within the ±0.1 volt as well as variable to less than 1.0 mv. over short time intervals of the order of 5–10 secs. Power source 25 is connected to the junction 42 of the load resistors 23 and 24 individually. It will be understood that the bridge so far described differs in some respects from the usual design employed in the art, which latter usually employs a symmetrical resistance arrangement consisting of load resistors having resistance values approximating those of the measuring resistors, and wherein power sources of lower voltage are satisfactory for obtaining similar magnitudes of current flow in the measuring resistors. In contrast, the bridge of this invention utilizes a relatively high ratio of load resistance to opposed measuring leg resistance under analyzing conditions, coupled with a high voltage power source; however, no claim for novelty is made with respect to these features.

According to prior art practice, the output signal would be taken from opposite junctions 31 and 32 by suitable signal leads connected to a commercial potentiometric self-balancing and recording device 26, such as that shown in FIG. 1, incorporating a meter 27 provided with a linkage 29 which operates the pen of a recorder 30 giving a time record of bridge unbalance voltage.

It is necessary to maintain the ambient temperature of the thermally sensitive measuring resistors as nearly equal and constant as practicable and, accordingly, resistors 21 and 22, together with their immediately associated circuitry are all enclosed in common within the heated thermostatically controlled region of cell 33, the ambient temperature of which is denoted $T_a$ for convenience in reference throughout the remainder of this description.

It will be understood that in chromatographic analysis the temperature of the analytical column must also be precisely controlled at $T_a$. Most commonly the ambient temperature $T_a$ is between 25 and 150° C., the temperature chosen depending upon the particular materials being separated and the column packing, as well as other factors. In contrast, the remainder of the electrical system need not have temperature control and is ordinarily maintained at room temperatures varying from about 20–30° C.

I have found that the foregoing precautions, while partially effective, are still not enough to insure accuracy of gas concentration measurement to the degree of one part per million which is necessary in chromatographic gas analysis. It is not known with certainty whether small residual differences in temperature coefficient of resistance of the thermistors, either alone or coupled with differences in geometry affecting heat dissipation from them, are responsible for the difficulty; however, this invention effects a complete compensation in any case.

Compensation according to this invention is accomplished by deliberately operating the bridge circuit in an off-balance manner hereinafter described and, in order to obtain an effective null despite the off-balance condition, I provide a voltage divider shunt resistance system around the thermistors of relatively high resistance, so as to draw a minimum of current. These shunt connections are made from junctions 31 and 32 to the common terminal of power source 25 connecting directly with thermistors 21 and 22. The resistance systems may conveniently be single resistance elements, indicated generally at 34 and 35 (34′ and 35′ for FIG. 2), tapped off at 39 and 37 as shown in FIGS. 1 and 2, to provide two resistance fractions in each, such as *34a*—*34b* and *35b*—*35a*, respectively. Leads 40 and 41 running from taps 39 and 37, respectively, connect with the terminals of the conventional self-balancing potentriometric recorder 26, hereinbefore described, which measures gas concentration as a function of the voltage impressed across the voltage divider taps. It will be understood that the voltage dividers can be provided with sliding or variable taps as shown in FIG. 1, thus being of conventional potentiometer design, or can have relatively fixed taps, or, in fact, that the two resistance elements of each divider can be completely independent resistors to which the tap connection is made through an intermediate circuit conductor, as shown in FIG. 2, thereby obviating connection with the resistors per se. Generally, the ratio of the resistance fractions *34a*:*34b* and *35b*:*35a*, and their equivalents for FIG. 2, ranges from about 1:4 to 1:6, a typical combination where the upper voltage divider resistance has a total resistance of 10,000 ohms being 2,000 ohms for *34a* and 8,000 ohms for *34b*.

It is highly desirable that the voltage dividers be made up of resistors having low, and more importantly, equal, temperature coefficients of resistance, and that their aggregate resistances be high compared with those of measuring resistors 21 and 22 when the latter are at their operating temperatures, so that the currents flowing through the shunt systems are negligible as compared with those flowing through the measuring resistors. "Helipot" potentiometers marketed by the Beckman Instrument Company have been satisfactory in this service. An even more refined voltage divider consists of the commercially available infinite impedance potential measuring design incorporating a standard cell, slidewire resistive potentiometer and galvanometer for determination of balance between slidewire potential and the unknown potential in measurement. This latter has the advantage of obtaining the equivalent of infinite resistance, and thus zero current, as regards the voltage-measuring circuit and such an arrangement is encompassed within this invention; however, resistors of the relative magnitudes hereinbefore taught are entirely satisfactory for most analytical service.

With the circuit of FIG. 1 it is evident that the voltage drop existing across thermistor 21 is applied to the shunt branch resistor 34 and a fraction of it, equal to the ratio of the resistance of *34a* to the sum of *34a* plus *34b*, determined by the position of movable tap 39, is applied through lead 40 to recording device 26. Similarly, the voltage drop existing across thermistor 22 is likewise applied to its shunt branch resistor 35 and a fraction of the drop, equal to the ratio of the resistance of *35b* to the sum of *35a* plus *35b*, is applied through lead 41 to the other terminal of device 26. Accordingly, if (1) the fractions chosen for each shunt branch are equal, (2) resistors 23 and 24 are set at equal values and thermistors 21 and 22 display equal resistances, the bridge will be in exact balance, as evidenced by the indication of meter 27, and the operation is identical with that of the conventional bridges of the prior art, except that only part of the bridge voltage is applied to the output device 26. However, if tap 39, for example, is set to any other position on resistor 34, a bridge which is truly balanced with respect to thermistors 21 and 22 will appear, from the viewpoint of meter 27, to be unbalanced. This effect is utilized in reverse to secure a null balance after accomplishing compensation for voltage source output and $T_a$ fluctuations in a manner now to be described.

To set the bridge for compensation it is first necessary to subject thermistors 21 and 22 to a flow of fluid of the same thermal conductivity and the desired flow rate while maintaining the temperature $T_a$ of cell 33 as constant as possible. For convenience, it is preferred to use the carrier gas, typically helium, for this purpose, and to adjust the thermostatted temperature $T_a$ to about the value it will have during the analyzer operation being prepared for. These adjustments should be made anew whenever the flow rate or temperature is to be changed materially for another application. When equilibrium of both flow and temperature is obtained, tap 39 is set with respect to branch resistor 34 so that the ratio of the resistance of *34a* to the sum of *34a* plus *34b* is approximately equal to the ratio of the resistance of *35b* to the sum of *35a* plus *35b*. Meter 27 will at this time display either a null reading, or only a small needle shift to either side of zero, and precise nulling at this stage is not essential to the achievement of compensation as hereinafter described.

Now, the output voltage of power source 25 is deliberately increased or decreased slightly, as by adjustment of a rheostat (not shown) in circuit therewith, or in other ways. Typically, an adjustment of ±2–3 volts for a 90 volt delivery source is adequate for the purposes. The record traced by recorder 30 is observed after each such adjustment. Normally transient fluctuations occur, with the reading soon stabilizing to a new value after each voltage adjustment. The resistance ratio in the load-resistor arms 31–42 and 32–42 is then varied by adjusting resistors 23 and 24 until it is found that a ratio is reached where power supply voltage fluctuations are no longer accompanied by permanent deflections of recorder 30. It might be observed that momentary deviations sometimes occur; however, these disappear rapidly and recorder 30 speedily returns to its original reading, so that such deviations can be ignored. This resistance ratio can be considered the ideal compensation setting, and the settings of 23 and 24 should not thereafter be altered as long as the same themistors 21 and 22 are employed in the bridge and the operating temperature level $T_a$ remains approximately the same. Once the compensating setting is attained, tap 39 may be set with respect to branch resistor 34 (or contact 37 with respect to branch resistor 35) to bring meter 27 to exact null, whereupon the bridge is ready for use.

Extensive experience with the bridge circuit of this invention has revealed that, while the deliberate compensation hereinbefore described was limited to voltage fluctuations in the power supply, there is concurrently obtained substantially complete compensation for even the most extreme fluctuations of $T_a$ which can be anticipated to occur during normal bridge service. The reason for this dual compensation is not known; however, it is believed that it is probably due to the establishment of a balance point based upon equal elevation of the temperatures of the two thermistors 21 and 22 above the ambient temperature $T_a$ in which they reside, as distinguished from the conventional balance point of equal voltage drop across a pair of thermistors. Regardless of the accuracy of this theory, concurrent compensation is an established fact, as is verified by the following tabulation of a series of tests adapted to check operation. In these tests two bridges were compared with one another, both bridges alternatively making use of the same thermistors in the same cell block, with temperatures controlled in the same way. The bridge denoted "Compensated" was constructed according to the design of FIG. 1, whereas the one denoted "Uncompensated" was conventional, in that no thermistor shunting branch resistors were utilized. The design bridge voltage in each instance was 90 volts and design $T_a$ was 25° C. Under these conditions the compensated bridge was adjusted as hereinbefore described so that there was no permanent zero shift as the voltage was changed over small amounts. Then, the supply voltage was deliberately varied through the tabulated values and the corresponding bridge output voltage read and tabulated. By way of comparison, the conventional bridge was balanced in the usual manner recommended in the art and its supply voltage varied through the same range as that for the compensated bridge. In the supply voltage variance tests, a balance point of 100 volts was selected arbitrarily as the value at which balance for both bridges was initially obtained.

A second test was performed to show the effect that variation in $T_a$ had upon the two bridges. This involved adjusting $T_a$ to four separate values within the range 25° C. to 62° C. and taking bridge readings at each temperature once thermal equilibrium was established. In these tests both bridges were initially brought to balance at the 25° C. ambient temperature as a common point of reference. The results of these tests were as follows:

*Voltage Variance Test (at 25° C.)*

| Supply Voltage (Volts) | Bridge Output (Microvolts) | |
|---|---|---|
| | Compensated | Uncompensated |
| 80 | 30 | 10,000 |
| 90 | 0 | 3,450 |
| 100 | 0 | 0 |
| 110 | 20 | 3,900 |
| 120 | 100 | 9,800 |

*Ambient Temperature Test*

| Ambient Temp., ° C. | Bridge Output (Microvolts) | |
|---|---|---|
| | Compensated | Uncompensated |
| 25 | 0 | 0 |
| 37 | 450 | 4,700 |
| 45 | 1,100 | 7,950 |
| 62 | 1,900 | 14,800 |

The tabulation shows that the uncompensated bridge displays a variation in reading with supply voltage 100 to 300 times greater than occurs with the compensated bridge. Similarly, the conventional bridge is 8 to 10 times more sensitive per unit of temperature change than is the case for the compensated bridge. An extension of tests to temperature levels as high as 150° C. indicates that closely similar results are obtained there as well as within the lower temperature region reported in detail.

It will be understood that the great variations in supply voltage and ambient temperature obtaining for the tests reported are, of course, much larger than those encountered in ordinary usage, where voltage regulation to within ±0.1 volt and ambient temperature maintenance to within ±0.01° C. are customarily achieved. Nevertheless, even with such relatively close regulation, a bridge of 50 microvolts full-scale deflection compensated according to this invention affords a signal-to-noise ratio and a sensitivity which are about 50 times greater than the most sensitive commercial thermal-conductivity-type chromatographs known to the art at this time.

FIGURE 2 shows a preferred embodiment of compensated bridge circuit according to this invention wherein adjustable contacts of the several circuit resistors are minimized in number and, at the same time, wherein these contacts are so disposed as to cancel out any thermal E.M.F.'s by affecting both adjacent arms equally. Thus, fixed resistor pairs 34'a—34'b and 35'a—35'b have interposed between them a simple resistive potentiometer 34c—35c connected via its movable tap 38' with the common terminal of power source 25. Similarly, fixed resistors 23' and 24' are substituted for the adjustable counterparts 23 and 24 of FIG. 1 and have interposed between them a resistive potentiometer 28 connected via its movable tap 42 and lead 20 to the remaining terminal of power source 25. The design of bridge of FIG. 2 is additionally preferred because it is adapted to vernier control as conventional in the art by the provision of a resistor of higher resistance value with a movable contact in parallel circuit with the full resistor 34c—35c, whereupon independent adjustment of tap 38' and the movable contact provides both coarse and fine adjustment of zero balance. Obviously, either one or both of the potentiometers 28 and 34c—35c may be utilized; however, it is preferred to use both together.

From the foregoing it will be understood that this invention can be modified in numerous respects within the skill of the art without departure from its essential spirit, and it is intended to be limited only by the scope of the appended claims.

What is claimed is:

1. A resistance bridge adapted to use in chromatographic gas analysis comprising, in combination, a D.-C. power source, first and second temperature-sensitive resistors having a relatively high temperature coefficient of resistance each connected at one end to a common terminal of said power source, first and second load resistors of relatively low temperature coefficient of resistance each connected at one end to the other terminal of said power source and at the other ends singly to the respective ends of said first and second temperature-sensitive resistors remote from said power source, thereby forming a pair of opposite junctions for said bridge, a first voltage divider of relatively low temperature coefficient of resistance connected in shunt relationship with respect to said first temperature-sensitive resistor between the junction of said pair adjacent to said first temperature-sensitive resistor and said common terminal of said power source, a second voltage divider of relatively low temperature coefficient of resistance connected in shunt relationship with respect to said second temperature-sensitive resistor between the junction of said pair adjacent to said second temperature-sensitive resistor and said common terminal of said power source and voltage indicating means connected across the taps of said voltage dividers, the resistance values of said load resistors being preselected so as to effect a concurrent compensation for power supply voltage and ambient temperature fluctuations encountered during said chromatographic analysis, and the taps of said first voltage divider and said second voltage divided being positioned prior to commencement of analysis with respect to the associated divider resistors so as to effect a nulling of the net voltage output of said bridge when said first and said second temperature-sensitive resistors are exposed to the same environment and ambient temperature.

2. A resistance bridge adapted to use in chromatographic gas analysis according to claim 1 wherein said first and said second temperature-sensitive resistors are thermistors.

3. A resistance bridge adapted to use in chromatographic gas analysis comprising, in combination, a D.-C. power source, first and second temperature-sensitive resistors having a relatively high temperature coefficient of resistance each connected at one end to a common terminal of said power source, a resistive potentiometer with the tap thereof connected to the other terminal of said power source, first and second load resistors of relatively low temperature coefficient of resistance each connected at one end to a single one of the opposite ends of said potentiometer and at the other ends singly to the respective ends of said first and said second temperature-sensitive resistors remote from said power source, thereby forming a pair of opposite junctions for said bridge, a first voltage divider of relatively low temperature coefficient of resistance connected in shunt relationship with respect to said first temperature-sensitive resistor between the junction of said pair adjacent to said first temperature-sensitive resistor and said common terminal of said power source, a second voltage divider of relatively low temperature coefficient of resistance connected in shunt relationship with respect to said second temperature-sensitive resistor between the junction of said pair adjacent to said second temperature-sensitive resistor and said common terminal of said power source, and voltage indicating means connected across the taps of said voltage dividers, the tap of said resistive potentiometer being preset so as to effect a concurrent compensation for power supply voltage and ambient temperature fluctuations encountered during said chromatographic analysis, and the taps of said first voltage divider and said second voltage divider being positioned prior to commencement of analysis with respect to the associated divider resistors so as to effect a nulling of the net voltage output of said bridge when said first and said second temperature-sensitive resistors are exposed to the same environment and ambient temperature.

4. A resistance bridge adapted to use in chromatographic gas analysis according to claim 3 provided with a second resistive potentiometer interposed in electrical circuit between said first and said second voltage dividers and connected through the tap thereof to said common terminal of said power source.

References Cited in the file of this patent

UNITED STATES PATENTS

| | | |
|---|---|---|
| 2,050,878 | Dallmann et al. | Aug. 11, 1936 |
| 2,310,472 | Sullivan | Feb. 9, 1943 |
| 2,596,992 | Fleming | May 20, 1952 |
| 2,759,354 | Cherry et al. | Aug. 21, 1956 |